US011782762B2

(12) United States Patent
Senior et al.

(10) Patent No.: US 11,782,762 B2
(45) Date of Patent: Oct. 10, 2023

(54) STACK MANAGEMENT

(71) Applicant: QUALCOMM Incorporated, San Diego, CA (US)

(72) Inventors: Richard Senior, San Diego, CA (US); Sundeep Kushwaha, Round Rock, TX (US); Harsha Gordhan Jagasia, Austin, TX (US); Christopher Ahn, San Diego, CA (US); Gurvinder Singh Chhabra, San Diego, CA (US); Nieyan Geng, San Diego, CA (US); Maksim Krasnyanskiy, San Diego, CA (US); Unni Prasad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 804 days.

(21) Appl. No.: 16/801,776

(22) Filed: Feb. 26, 2020

(65) Prior Publication Data

US 2020/0272520 A1    Aug. 27, 2020

Related U.S. Application Data

(60) Provisional application No. 62/811,403, filed on Feb. 27, 2019.

(51) Int. Cl.
*G06F 9/46* (2006.01)
*G06F 9/50* (2006.01)
(Continued)

(52) U.S. Cl.
CPC .......... *G06F 9/5016* (2013.01); *G06F 9/4806* (2013.01); *G06F 9/5022* (2013.01);
(Continued)

(58) Field of Classification Search
None
See application file for complete search history.

(56) References Cited

U.S. PATENT DOCUMENTS 6,286,104 B1    9/2001   Buhle et al.
7,178,002 B2 *  2/2007   Boucher ............. G06F 12/0223
                                            711/2
(Continued)

FOREIGN PATENT DOCUMENTS

EP    0840210 A2   5/1998
EP    1387248 A2   2/2004
EP    1696318 A1   8/2006

OTHER PUBLICATIONS

"Automatically Extensible Discontiguous Stacks", IBM Technical Disclosure Bulletin, International Business Machines Corp. (Thornwood), US, vol. 39, No. 2, Feb. 1, 1996 (Feb. 1, 1996), pp. 307-313, XP000559912, ISSN: 0018-8689, p. 307, line 1-line 23, p. 308, p. 312, paragraph 3-paragraph 4.
(Continued)

*Primary Examiner* — Bing Zhao
(74) *Attorney, Agent, or Firm* — Moore IP/Qualcomm

(57) ABSTRACT

A method of managing a stack includes detecting, by a stack manager of a processor, that a size of a frame to be allocated exceeds available space of a first stack. The first stack is used by a particular task executing at the processor. The method also includes designating a second stack for use by the particular task. The method further includes copying metadata associated with the first stack to the second stack. The metadata enables the stack manager to transition from the second stack to the first stack upon detection that the second stack is no longer in use by the particular task. The method also includes allocating the frame in the second stack.

30 Claims, 7 Drawing Sheets

(51) Int. Cl.
  *G06F 9/48*    (2006.01)
  *G06F 12/0806* (2016.01)
(52) U.S. Cl.
  CPC .... *G06F 12/0806* (2013.01); *G06F 2209/481* (2013.01); *G06F 2209/503* (2013.01); *G06F 2212/1021* (2013.01)

(56) References Cited

U.S. PATENT DOCUMENTS

2005/0198464 A1    9/2005  Sokolov
2007/0282928 A1*  12/2007  Jiao ........................ G06F 9/485

OTHER PUBLICATIONS

Middha Bhuvan, et al., "MTSS", Cases 2005, International Conference on Compilers, Architecture, and Synthesis for Embedded Systems, Sep. 24-27, 2005, San Francisco, California, USA. ACM Press, New York, NY, Sep. 24, 2005 (Sep. 24, 2005), pp. 191-201, XP058153196, DOI: 10.1145/1086297.1086323, ISBN: 978-1-59593-149-8, p. 192, right-hand column line 22-line 41.
International Search Report and Written Opinion—PCT/US2020/020087—ISAEPO—dated May 19, 2020.

* cited by examiner

STACK MANAGEMENT

I. CROSS-REFERENCE TO RELATED APPLICATIONS

The present application claims priority from U.S. Provisional Patent Application No. 62/811,403, filed Feb. 27, 2019, entitled "STACK MANAGEMENT," which is incorporated herein by reference in its entirety.

II. FIELD

The present disclosure is generally related to stack management.

III. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Computing devices include processors, such as a digital signal processor (DSP). In DSPs, each task generally has an associated region of memory that is referred to as a stack. In some DSPs, an average size of a stack associated with a task is 8 kilobytes (KB), although in some cases a stack associated with a task can be as large as 128 KB. To protect software integrity, an exception is generated if a task attempts to use space beyond the allocated stack. Stacks are typically sized to handle a worst-case situation for the particular tasks. As a result, a large proportion of allocated stack space remains unused in normal (e.g., non-worst-case) situations.

IV. SUMMARY

In a particular aspect, a method of managing a stack includes detecting, by a stack manager of a processor, that a size of a frame to be allocated exceeds available space of a first stack. The first stack is used by a particular task executing at the processor. The method also includes designating a second stack for use by the particular task. The method further includes copying metadata associated with the first stack to the second stack. The metadata enables the stack manager to transition from the second stack to the first stack upon detection that the second stack is no longer in use by the particular task. The method also includes allocating the frame in the second stack.

In another particular aspect, a device includes a first memory, a second memory, and a stack manager of a processor. The first memory is configured to include a first stack. The second memory is configured to include a second stack. The stack manager is configured to detect that a size of a frame to be allocated exceeds available space of the first stack. The first stack is used by a particular task executing at the processor. The stack manager is also configured to designate the second stack for use by the particular task. The stack manager is further configured to copy metadata associated with the first stack to the second stack. The metadata enables the stack manager to transition from the second stack to the first stack upon detection that the second stack is no longer in use by the particular task. The stack manager is also configured to allocate the frame in the second stack.

In another particular aspect, a computer-readable storage device stores instructions that, when executed by a processor, cause the processor to perform operations including detecting that a size of a frame to be allocated exceeds available space of a first stack. The first stack is used by a particular task executing at the processor. The operations also include designating a second stack for use by the particular task. The operations further include copying metadata associated with the first stack to the second stack. The metadata enables a stack manager to transition from the second stack to the first stack upon detection that the second stack is no longer in use by the particular task. The operations also include allocating the frame in the second stack.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
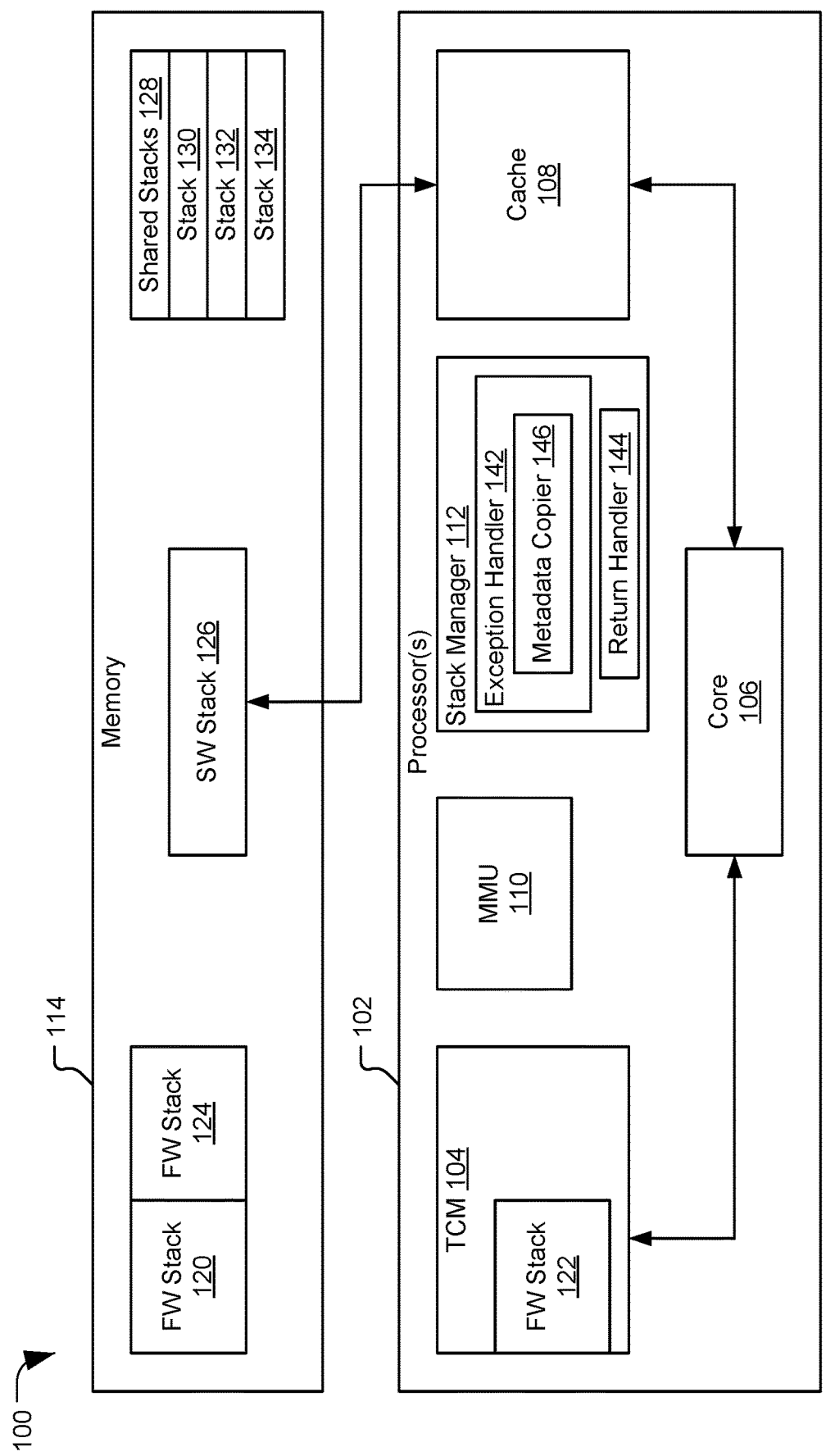
FIG. 1 is a block diagram of a particular illustrative aspect of a system operable to perform stack management.

Referring to FIG. 1, a particular illustrative aspect of a system operable to perform stack management is disclosed and generally designated 100. The system 100 includes one or more processors 102, collectively referred to herein as "processor 102." The processor 102 includes a core 106, such as a digital signal processor (DSP) core, a central processing unit (CPU) core, or both. The processor 102 includes a memory management unit (MMU) 110, a stack manager 112, or both. In FIG. 1, the MMU 110 and the stack manager 112 are illustrated as external to the core 106. In some implementations, the core 106 includes the MMU 110, the stack manager 112, or both. The processor 102 includes a tightly coupled memory (TCM) 104, a cache 108 (e.g., a level 2 (L2) cache memory), or both.

The processor 102 is coupled to a memory 114 (e.g., double data rate (DDR) synchronous dynamic random access memory (SDRAM). In a particular aspect, the memory 114 is configured to include a firmware (FW) stack 120 (e.g., a start stack), a FW stack 124 (e.g., an end stack), or both. In a particular aspect, the TCM 104 includes a FW stack 122. In a particular aspect, the FW stack 122 has a first latency time (e.g., read latency time, write latency time, access latency time, or a combination thereof) that is reduced (e.g., lower than) as compared to a second latency time of the FW stack 120, a third latency time of the FW stack 124, or both. In an example, the reduced latency is due to faster data access at the TCM 104 as compared to the memory 114.

In a particular aspect, a FW stack is used for firmware tasks, such as tasks performed by firmware to initialize a CPU core, memory, peripherals, graphics, etc. In a particular aspect, a software (SW) stack is used for software tasks, such as a software application being executed by a CPU. In a particular implementation, firmware tasks may have higher priority and may receive stack space in lower latency memory as compared to software tasks. In a particular aspect, the memory 114 includes a software (SW) stack 126 and one or more shared stacks 128. For example, the shared stacks 128 include a pool of available memory space that can be allocated, on a dynamic basis, for use as stacks by tasks at the processor 102. As illustrated, the shared stacks 128 include a stack 130, a stack 132, and a stack 134. Although three stacks (the stack 130, the stack 132, and the stack 134) are illustrated, in other implementations the shared stacks 128 can include any number of stacks. In a particular aspect, each of the shared stacks 128 is allocated an equal-sized block of the memory 114. For example, each of the shared stacks 128 can have a first particular size, and the first particular size can be larger than a size of the SW stack 126. Alternatively, the shared stacks 128 can be of various sizes. For example, the stack 130 may have a first size that is different from (e.g., larger than) a second size of the stack 132.

In a conventional implementation of dynamically allocated stacks, when a task executing at the processor 102 outgrows its allocated stack, the MMU 110 may be configured to assist in allocating additional memory for stack use by the task, such as by providing virtual-to-physical address translation (e.g., in a Translation Lookaside Buffer (TLB)) when the stack crosses a memory page boundary. However, according to aspects of the present disclosure, the stack manager 112 is configured to perform stack management, including dynamic allocation of stack space, independently of the MMU 110, as further described with reference to FIG. 2.

The stack manager 112 includes an exception handler 142, a return handler 144, one or more registers to store stack management values, or combinations thereof. The exception handler 142 is configured to enable the stack manager 112 to transition between distinct (e.g., non-contiguous) portions of memory used as a stack by a single task, referred to as a "split stack," when the task outgrows a first portion of allocated stack memory (a "first stack" of the task's split stack) and continues into a next portion of allocated stack memory (a "second stack" of the split stack). For example, a firmware task may have a split stack that begins in the FW stack 120 (e.g., a task set-up portion of the stack) and that extends into the FW stack 122 in the TCM 104 to enable faster access for "hot" portions of the task. The exception handler 142 enables the stack manager 112 to transition from stack operations at the FW stack 120 to stack operations at the FW stack 122 when the stack for the firmware task outgrows the FW stack 120 (e.g., a stack overflow occurs), as described in further detail with reference to FIGS. 2-6. If the firmware task requires a stack that exceeds the combined size of the FW stack 120 and the FW stack 122, then the exception handler 142 enables the stack manager 112 to transition from the FW stack 122 to a third stack, such as the FW stack 124 or a stack in the shared stacks 128. In a particular aspect, the FW stack 120 corresponds to a first memory region of the memory 114 that is distinct from a second memory region of the memory 114 that corresponds to the FW stack 124. As used herein, "distinct" includes at least one difference. For example, a first component is distinct from a second component when there is at least one difference that distinguishes the first component from the second component (e.g., "the first component" and "the second component" are not different labels for the same component). As another example, a software task may begin in the SW stack 126 and, upon exceeding the SW stack 126 (e.g., a stack overflow), the exception handler 142 enables the stack manager 112 to transition to a second stack for the software task in the shared stacks 128. To illustrate, the exception handler 142 includes a metadata copier 146. The metadata copier 146 operates to copy metadata from a first stack to a second stack as part of the transition from the first stack to the second stack, as further described with reference to FIG. 2. Stacks are allocated to a task in a linear fashion, using functionality implemented in hardware, software, or both. Stack overflow can be detected in hardware or software. In a particular aspect, the stack manager 112 is implemented in software and no additional hardware is used to implement stack management using the stack manager 112 as compared to hardware used to implement stack management using the MMU 110.

The return handler 144 is configured to enable the stack manager 112 to transition from the second stack to the first stack, independently of the MMU 110, during management of a split stack for a task. For example, when the firmware task described above returns from the first function in the FW stack 122, the return handler 144 enables the stack manager 112 to continue stack operations at the FW stack 120, as described in further detail with reference to FIGS. 2-6. As another example, when the software stack described above returns from the first function of the software task's stack in the shared stacks 128, the return handler 144 enables the stack manager 112 to continue stack operations at the SW stack 126.

In some implementations, software tasks do not have a stack portion in the TCM 104 and a portion (or all) of the TCM 104 is reserved for stack use by firmware tasks (which may generally have higher priority than software tasks). In other implementations, one or more high priority software tasks may receive stack space in the TCM 104. In other implementations, the TCM 104 is not used for stacks and instead all stacks are implemented in the memory 114. Accordingly, the disclosure is not limited to specific examples described above.

By using the exception handler 142 and the return handler 144 to transition between stacks of a split-stack implementation, stacks for individual tasks can be increased or decreased in size without being confined to memory page boundaries and without using the MMU 110 for address translation. As a result, stack size allocation can be provided more flexibly based on particular task characteristics and enabling reduced overall memory usage. Further, stack usage can be tracked by the stack manager 112 and unused stacks can be detected and de-allocated based on execution of the return handler 144, providing a reduced complexity and time-consumption as compared to a conventional de-allocation of stacks using an MMU, which can include interrupting executing tasks and comparing a stack pointer (e.g., a current stack pointer) of a task to a memory address of a stack allocated to the task to determine whether memory corresponding to the allocated stack can be released.

Figure 2:
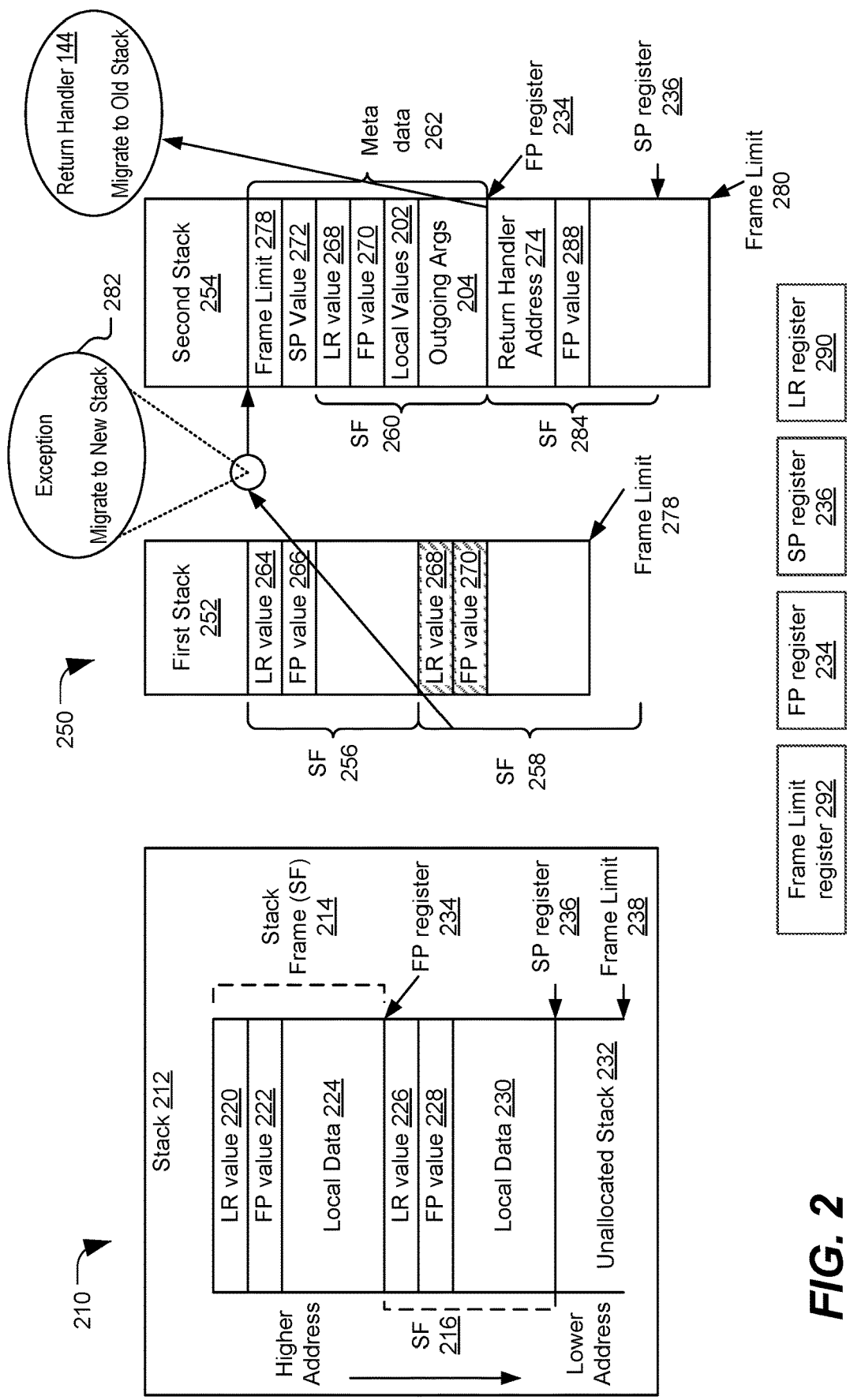
FIG. 2 is a diagram of particular illustrative examples of stack management.

Referring to FIG. 2, a particular example of first stack management is disclosed and generally designated 210, and a particular example of second stack management is disclosed and generally designated 250. In a particular aspect, the first stack management 210 corresponds to a conventional implementation in conjunction with a MMU, such as the MMU 110 of FIG. 1. In a particular aspect, the second stack management 250 is performed by the stack manager 112, the exception handler 142, the return handler 144 of FIG. 1, or a combination thereof. In a particular aspect, the first stack management 210 and the second stack management 250 are alternative implementations. In this aspect, either the MMU 110 performs the first stack management 210 or the stack manager 112 performs the second stack management 250.

In the example for the first stack management 210, a stack 212 includes a stack frame 214, a stack frame 216, and unallocated stack 232. The stack frame 214 includes a link return (LR) value 220, a frame pointer (FP) value 222, and local data 224 for a first function called by a task. The stack frame 216 includes a LR value 226, a FP value 228, and local data 230 for a second function called by a task. A FP register 234 indicates an address of a memory location of the stack 212 at which the stack frame 216 (e.g., a last stack frame) is stored. A stack pointer (SP) register 236 indicates an address of a memory location of the stack 212 subsequent to the stack frame 216. For example, the SP register 236 indicates an address of a memory location of the stack 212 at which a next stack frame could be stored if the stack frame size does not exceed a size of the unallocated stack 232. A frame limit 238 (e.g., a stack limit) indicates a last memory address of (e.g., a lowest memory address allocated to) the stack 212. In a particular aspect, the frame limit 238 indicates a size of the stack 212.

A MMU is used in conjunction with performing dynamic allocation of the stack 212. For example, a MMU, in response to determining that a size of the unallocated stack 232 is less than a threshold and that data is to be written to the stack 212, allocates one or more memory pages as a second stack. In a particular aspect, the one or more memory pages of the second stack are not contiguous to memory allocated to the stack 212. In a particular aspect, a translation lookaside buffer (TLB) is configured to map a first virtual address to a first memory location of the stack 212. The MMU updates the TLB to map a second virtual address to a second memory location of the second stack. In a particular aspect, the second virtual address is next in a sequence of addresses after the first virtual address.

In the example for the second stack management 250, a first stack 252 is included in a first memory. A second stack 254 is included in a second memory that may be distinct from the first memory. In a particular example, the first stack 252 is included in the FW stack 120 of the memory 114 of FIG. 1 and the second stack 254 is included in the FW stack 122 of the TCM 104 of FIG. 1. In another example, the first stack 252 is included in the FW stack 122 of the TCM 104 and the second stack 254 is included in the FW stack 124 of the memory 114. In a third example, the first stack 252 includes the SW stack 126 of FIG. 1 and the second stack 254 is included in the shared stacks 128 of FIG. 1. For example, the second stack 254 may include the stack 130, the stack 132, or the stack 134 of FIG. 1.

The first memory can be the same size as the second memory. Alternatively, the first memory can be a different size (e.g., smaller or larger) than the second memory. In a particular aspect, the first memory has reduced latency time (e.g., read latency time, write latency time, access latency time, or a combination thereof) as compared to the second memory. In an alternate aspect, the first memory has the same latency time as the second memory. In a particular aspect, the first memory is distinct from the second memory in that at least one of a size, a latency time, or a memory region of the first memory is different from a corresponding one of a size, a latency time, or a memory region of the second memory. In a particular aspect, a first size of the first stack 252 is equal to a second size of the second stack 254. In an alternate aspect, the first size of the first stack 252 is distinct (e.g., larger or smaller) from the second size of the second stack 254. A frame limit 278 indicates a last memory address of (e.g., a lowest memory address allocated to) the first stack 252. In a particular aspect, the frame limit 278 indicates a size of the first stack 252. A frame limit 280 indicates a last memory address of (e.g., a lowest memory address allocated to) the second stack 254. In a particular aspect, the frame limit 280 indicates a size of the second stack 254.

During operation, a stack frame 256 corresponding to a first function call of a task is added to the first stack 252. For example, a first task (e.g., a process) is executing at the core 106. The stack manager 112, in response to initialization of the first task, designates the first stack 252 for use by the first task executing at the core 106. The stack manager 112 updates a frame limit register 292 to indicate the frame limit 278 of the first stack 252. The stack manager 112 adds the stack frame 256 to the first stack 252 as part of execution of the first function call. The stack frame 256 includes a LR value 264, a FP value 266, or both. The LR value 264 indicates a return address of the first function call. The stack manager 112 updates the FP register 234 to have a FP value 270 indicating a memory location of the first stack 252 at which the stack frame 256 begins. The SP register 236 has a SP value 272 indicating a memory location of the first stack 252 at which the stack frame 256 ends. Although each of the first stack management 210 and the second stack management 250 is described as using the FP register 234 and the SP register 236, in other implementations the MMU 110 performs the first stack management 210 using at least one of a FP register or a SP register that is distinct from a corresponding one of the FP register 234 or the SP register 236 used by the stack manager 112 to perform the second stack management 250.

In response to execution of a second function call of the first task at the core 106, the stack manager 112 attempts to add a stack frame 258 to the first stack 252. The stack frame 258 includes a LR value 268, the FP value 270 of the FP register 234, one or more local values 202, one or more arguments 204, or a combination thereof. The local values 202 correspond to local variable values of a function of the second function call. The arguments 204 indicate argument values of the second function call. The LR value 268 indicates a return address of the second function call. The FP value 270 indicates the memory location of the first stack 252 at which the stack frame 256 is stored. Upon attempting to add the stack frame 258 to the first stack 252, the stack manager 112 attempts to store (e.g., push) the LR value 268 (e.g., the return address of the second function call), the FP value 270 of the FP register 234, or both, to the first stack 252. The stack manager 112 updates the FP register 234 to indicate the SP value 272 (e.g., indicating a memory location of the first stack 252 at which the stack frame 258 begins) of the SP register 236. The stack manager 112 attempts to update the SP register 236 to indicate a memory location of the first stack 252 at which the stack frame 258 would end, if the stack frame 258 did not exceed the available space in the first stack 252. Updating the SP register 236 to have a value beyond (e.g., less than) the frame limit 278 (e.g., indicated by the frame limit register 292) causes an exception 282 to be generated.

The stack manager 112, in response to determining that a size of the stack frame 258 exceeds available space of the first stack 252, designates the second stack 254 for use by the first task, as further described with reference to FIG. 3. In a particular example, each stack frame of the first stack 252 is of the same frame size. In a particular aspect, the stack manager 112 determines a value based on (e.g., a sum of) the frame size and an address indicated by the SP register 236 (prior to attempting to add the stack frame 258). The stack manager 112, in response to determining that the determined value exceeds a value (e.g., the frame limit 278) indicated by the frame limit register 292, determines that the size of the stack frame 258 exceeds the available space of the first stack 252. The exception 282 occurs when the stack manager 112 attempts to allocate the stack frame 258 at the first stack 252 and, in response to the exception 282, the stack manager 112 determines that the size of the stack frame 258 exceeds the available space of the first stack 252. In a particular example, the exception 282 is caused when the stack manager 112 attempts to allocate memory beyond the frame limit 278 for at least a portion of the stack frame 258. FIG. 2 illustrates that adding the stack frame 258 to the first stack 252 would have exceeded the frame limit 278. In a particular aspect, the stack manager 112 refrains from adding the stack frame 258 to the first stack 252.

The stack manager 112 executes the exception handler 142 of FIG. 1 in response to the exception 282. In a particular example, the exception handler 142 enables the stack manager 112 to transition from the first stack 252 in the first memory to the second stack 254 in the second memory. For example, the exception handler 142, in response to a determination that the size of the stack frame 258 exceeds the available space of the first stack 252, designates the second stack 254 for use by the first task. In a particular aspect, the first stack 252 is associated with a first tier of stacks and the second stack 254 is associated with a second tier of stacks, as further described with reference to FIG. 3. The exception handler 142, in response to determining that the first stack 252 is associated with the first tier of stacks, determines whether a stack in a next tier of stacks (e.g., the second tier of stacks) is available. The exception handler 142, in response to determining that the second stack 254 associated with the second tier of stacks is available, designates the second stack 254 for use by the first task.

The exception handler 142 (e.g., the metadata copier 146 of FIG. 1) copies metadata 262 associated with the first stack 252 to the second stack 254. For example, the exception handler 142 stores a state (e.g., register values) upon transition from the first stack 252 to the second stack 254 to enable the state to be recovered upon a reverse transition from the second stack 254 when the second stack 254 is no longer in use by the first task. The exception handler 142 copies the value (e.g., the frame limit 278) of the frame limit register 292 to the second stack 254. The exception handler 142 updates the frame limit register 292 to indicate the frame limit 280 of the second stack 254. The exception handler 142 copies a SP value 272 (e.g., a memory location of the first stack 252 subsequent to the stack frame 256) of the SP register 236 to the second stack 254. The exception handler 142 allocates a stack frame 260 on the second stack 254 for the second function call (e.g., the function call previously attempted to be added to the first stack 252 in the stack frame 258). The exception handler 142 adds the LR value 268 (e.g., a return address of the second function call) to the second stack 254. The exception handler 142 copies the FP value 270 (e.g., a value indicating a memory location of the first stack 252 at which the stack frame 256 is stored) of the FP register 234 to the second stack 254. The exception handler 142 adds the local values 202, the arguments 204, or a combination thereof, to the second stack 254. The exception handler 142 updates a LR register 290 (e.g., a link return register) to indicate a return handler address 274 of the return handler 144 of FIG. 1.

In a particular aspect, the metadata 262 includes the frame limit 278, the SP value 272, the LR value 268, the FP value 270, the local values 202, the arguments 204, the return handler address 274, or a combination thereof. In a particular aspect, the stack frame 260 includes the LR value 268, the FP value 270, local values 202, arguments 204, or a combination thereof. The exception handler 142 updates the FP register 234 to indicate a FP value 288 corresponding to (e.g., indicating) a memory location of the second stack 254 at which the LR value 268 is stored. The exception handler 142 updates the SP register 236 to indicate a memory location of the second stack 254 that is subsequent to the stack frame 260.

The stack manager 112 allocates a stack frame 284 for a third function call of the first task. For example, the stack manager 112 copies a value (e.g., the return handler address 274) of the LR register 290 to the second stack 254. The stack manager 112 copies a value (e.g., the FP value 288) of the FP register 234 to the second stack 254. The stack frame 284 includes the return handler address 274, the FP value 288, function call data (e.g., one or more local values, one or more arguments, or a combination thereof) associated with the third function call, or a combination thereof. The stack manager 112 updates the LR register 290 to indicate a value corresponding to a return address of the third function call. Upon return from a function call, execution generally continues at an address indicated by the LR register 290. Updating the LR register 290 to indicate the return address of the third function call enables execution of the first task to continue from the return address upon a subsequent return from the third function call. The stack manager 112 updates the FP register 234 to indicate a value (e.g., a memory location of the second stack 254 at which the return handler address 274 is stored) of the SP register 236. The stack manager 112 updates the SP register 236 to indicate a memory location of the second stack 254 that is subsequent to the stack frame 284.

The metadata 262 enables the stack manager 112 to transition from the second stack 254 to the first stack 252 upon detection that the second stack 254 is no longer in use by the first task. For example, the stack manager 112 enables recovery of the state that was stored upon transition from the first stack 252 to the second stack 254. The stack manager 112, in response to determining that the first task is returning from the third function call associated with the stack frame 284, removes the stack frame 284 from the second stack 254. In a particular aspect, removing the stack frame 284 from the second stack 254 includes updating the SP register 236 to indicate a value (e.g., a memory location of the second stack 254 at which the return handler address 274 was stored) of the FP register 234, updating the FP register 234 to indicate the FP value 288 (e.g., a memory location of the second stack 254 at which the LR value 268 is stored) retrieved from the second stack 254, or both. The stack manager 112, in response to determining that the first task is returning from the third function call associated with the stack frame 284, determines that execution of the first task is to continue at the address (e.g., a return address of the third function call) indicated by the LR register 290 and updates the LR register 290 to indicate the return handler address 274 retrieved from the second stack 254. In a particular aspect, updating the LR register 290 to indicate the return handler address 274 enables execution of the return handler 144 to be initiated upon a subsequent return from the function call (e.g., the second function call) that previously caused the transition from the first stack 252 to the second stack 254.

The stack manager 112, in response to determining that the first task is returning from the second function call associated with the stack frame 260, removes the stack frame 260 from the second stack 254. In a particular aspect, removing the stack frame 260 from the second stack 254 includes updating the SP register 236 and the FP register 234. For example, the stack manager 112 updates the SP register 236 to indicate a value (e.g., the FP value 288, a memory location of the second stack 254 at which the LR value 268 is stored) of the FP register 234. As another example, the stack manager 112 updates the FP register 234 to indicate the FP value 270 (e.g., a value indicating a memory location of the first stack 252 at which the stack frame 256 is stored). The stack manager 112, in response to determining that the first task is returning from the second function call associated with the stack frame 260, determines that execution is to continue at the address (e.g., the return handler address 274) indicated by the LR register 290 and updates the LR register 290 to indicate the LR value 268 (e.g., a return address of the second function call) retrieved from the second stack 254. Execution of the return handler 144 is initiated at an instruction stored at the return handler address 274 indicated by the LR register 290. In a particular aspect, updating the LR register 290 to indicate the LR value 268 enables execution to continue at the return address of the second function call subsequent to execution of the return handler 144.

In a particular aspect, the return handler 144, in response to determining that the first task is returning from the second function call, reconfigures the stack manager 112 to transition from the second stack 254 to the first stack 252. For example, the return handler 144 deallocates the second stack 254 from the first task. To illustrate, deallocating the second stack 254 includes designating the second stack 254 as available for a next allocation. In a particular aspect, the second stack 254 is moved to the cache 108 during execution of the second function call and the third function call. In this aspect, the second stack 254 is designated as available for a next allocation while the second stack 254 is stored in the cache 108. Allocation (e.g., a next allocation) of the second stack 254 while the second stack 254 is stored in the cache 108 improves performance as compared to allocating the second stack 254 (or another stack) that is not stored in the cache 108.

In a particular aspect, the return handler 144 updates the SP register 236 to indicate the SP value 272 (e.g., a memory location of the first stack 252 at which the LR value 268 was stored) retrieved from the second stack 254. In a particular aspect, the return handler 144 updates the frame limit register 292 to indicate the frame limit 278 retrieved from the second stack 254. Execution of the first task continues at an instruction stored at the address (e.g., the return address of the second function call) indicated by the LR register 290.

The second stack management 250 thus enables transitioning from the first stack 252 to the second stack 254 independently of the MMU 110. The second stack management 250 enables additional stack space to be dynamically allocated to tasks that exceed a corresponding allocation in a first stack. When the additional stack space is no longer in use by a designated task, the additional stack space can be dynamically reallocated. Although FIG. 2 describes the second stack management 250 for a single task, in some implementations the second stack management 250 is implemented for each task of the processor 102. In one such implementation, for each new task initiated at the processor 102 (e.g., the core 106), a corresponding initial stack is allocated in a first memory. For each task that exceeds its corresponding initial stack, a corresponding secondary stack is dynamically allocated in the second memory.

Figure 3:
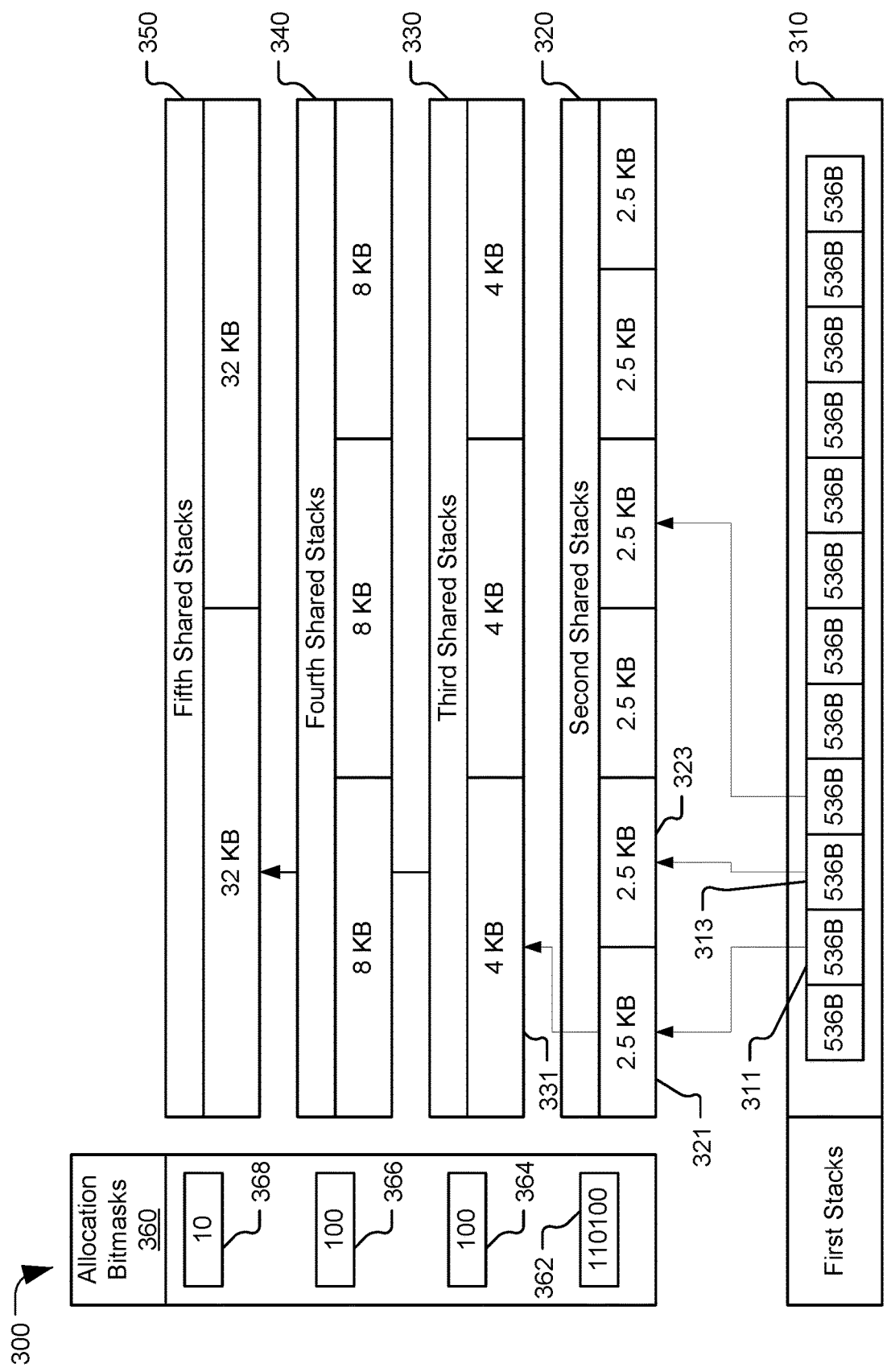
FIG. 3 is a diagram of a particular illustrative example of stack management.

Referring to FIG. 3, an example of stack management is shown and generally designated 300. In a particular aspect, the stack management is performed by the stack manager 112, the exception handler 142, the return handler 144 of FIG. 1, or a combination thereof, as described with reference to FIG. 2.

The example 300 indicates multiple tiers of stacks. The example 300 indicates first stacks 310, second shared stacks 320, third shared stacks 330, fourth shared stacks 340, and fifth shared stacks 350 corresponding to a first stack tier, a second stack tier, a third stack tier, a fourth stack tier, and a fifth stack tier, respectively. In a particular aspect, the multiple tiers of stacks are included in the system 100 of FIG. 1. It should be understood that five stack tiers are provided as an illustrative example, in some aspects, the system 100 includes fewer than five stack tiers or more than five stack tiers.

In a particular aspect, the first stack 252 of FIG. 2 is included in a particular stack tier (e.g., the first stacks 310, the second shared stacks 320, the third shared stacks 330, the fourth shared stacks 340, or the fifth shared stacks 350), and the second stack 254 of FIG. 2 is included in another stack tier (e.g., the first stacks 310, the second shared stacks 320, the third shared stacks 330, the fourth shared stacks 340, or the fifth shared stacks 350) that is next after (e.g., above) the particular stack tier.

In FIG. 3, each stack tier includes fewer and larger stacks as compared to a previous stack tier. For example, the first stacks 310, the second shared stacks 320, the third shared stacks 330, the fourth shared stacks 340, and the fifth shared stacks 350 include a first plurality of stacks of a first size (e.g., 536 bytes (B)), a second plurality of stacks of a second size (e.g., 2.5 KB), a third plurality of stacks of a third size (e.g., 4 KB), a fourth plurality of stacks of a fourth size (e.g., 8 KB), and a fifth plurality of stacks of a fifth size (e.g., 32 KB), respectively. It should be understood that each stack tier including fewer and larger stacks is provided as an illustrative example. In an alternate implementation, a stack (e.g., the first stack 252) included in a particular tier has the same size as a stack (e.g., the second stack 254) included in another tier. In another alternative implementation, a stack included in a lower tier has a larger size than a stack included in a higher tier, and the higher tier includes more stacks than are in the lower tier.

The stack manager 112 allocates, for each new task initiated at the processor 102 (e.g., the core 106), a corresponding first stack of the first stacks 310. For example, the stack manager 112 allocates a stack 311 (e.g., the first stack 252) of the first stacks 310 to a first task initiated at the core 106. The stack manager 112 also allocates a stack 313 of the first stacks 310 to a second task initiated at the core 106.

The stack manager 112 maintains allocation bit masks 360 corresponding to shared stacks. For example, the allocation bit masks 360 include a bit mask 362, a bit mask 364, a bit mask 366, and a bit mask 368 associated with the second shared stacks 320, the third shared stacks 330, the fourth shared stacks 340, and the fifth shared stacks 350, respectively. A particular bit of a bit mask of the allocation bit masks 360 is associated with a particular stack of the corresponding shared stacks. For example, each bit of the bit mask 362 corresponds to a particular stack of the second shared stacks 320.

The stack manager 112 (e.g., the exception handler 142), in response to determining that the first task is exceeding the stack 311, determines whether any of the second shared stacks 320 are available for allocation. For example, the stack manager 112, in response to determining that a particular bit of the bit mask 362 has a first value (e.g., 0), determines that a stack 321 (of the second shared stacks 320) corresponding to the particular bit is available. The stack manager 112 (e.g., the exception handler 142) allocates the stack 321 for use by the first task and updates the particular bit of the bit mask 362 to have a second value (e.g., 1) indicating that the stack 321 is unavailable for allocation. It should be understood that using the allocation bit masks 360 to track allocated stacks is provided as an illustrative example. In some implementations, other data structures (e.g., a list, a stack, a table, or a set) can be used to track stack allocations. Various other techniques can be used to allocate stacks. In a particular implementation, a last-in first-out policy (or a first-in first-out policy) is used to allocate from the shared stacks 320, 330, 340, 350, or a combination thereof.

The stack manager 112 (e.g., the exception handler 142), in response to determining that the second task is exceeding the stack 313, allocates a stack 323 of the second shared stacks 320 to the second task. If a task is exceeding its stack in the second shared stacks 320, the stack manager 112 (e.g., the exception handler 142) can allocate an additional stack on a higher tier. For example, the stack manager 112 (e.g., the exception handler 142), in response to determining that the first task is exceeding the stack 321, allocates a stack 331 of the third shared stacks 330 to the first task.

The example 300 thus illustrates dynamic allocation of shared stacks to tasks that use more stack space. The dynamic allocation enables large amounts of stack space to be dynamically available to each task without reserving large amounts of stack space that would accommodate the worst case scenario for each task. For example, the first task used a larger amount (e.g., 7 KB) of stack space than used by the second task. Assuming a worst case scenario would imply that at least the larger amount (e.g., 7 KB) of stack space is to be reserved for each task. The example 300 enables a smaller amount (e.g., 536 B) of stack space to be reserved for each task with additional stack space dynamically allocated to tasks that exceed the smaller amount of stack space.

Figure 4:
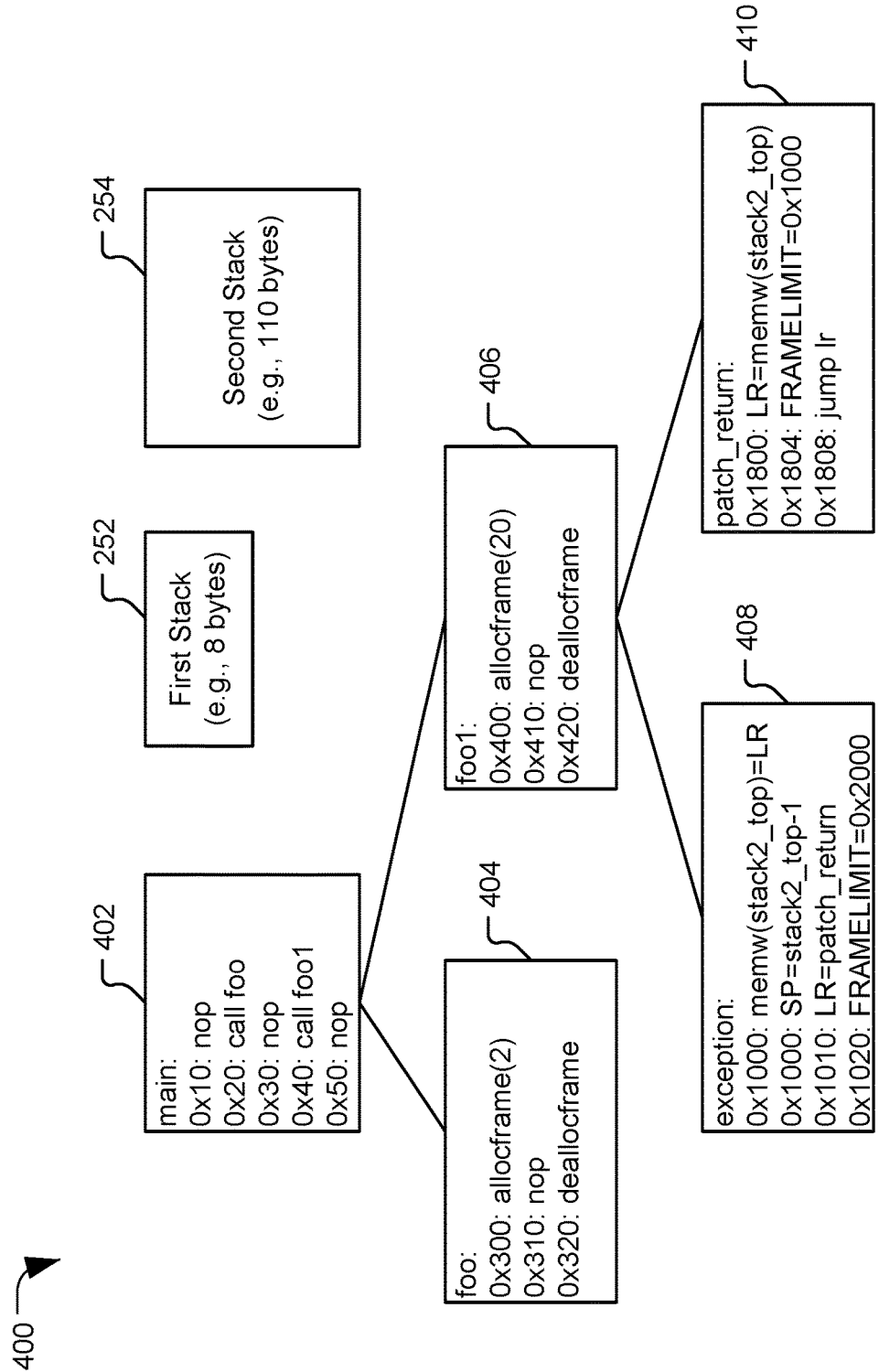
FIG. 4 is a diagram of a particular illustrative example of stack management.

Referring to FIG. 4, an example of stack management is shown and generally designated 400. In a particular aspect, the stack management is performed by the stack manager 112, the exception handler 142, the return handler 144 of FIG. 1, or a combination thereof.

The example 400 indicates a task 402 initiated at the core 106. A first instruction (e.g., at address 0x20, where "0x" indicates a hexadecimal numbering scheme) of the task 402 includes a first function call 404 to a first function (e.g., foo). A second instruction (e.g., at address 0x40) of the task 402 includes a second function call 406 to a second function (e.g., foo1).

In a particular aspect, a function call includes an allocation request, one or more additional instructions, a deallocation request, or a combination thereof. An allocation request (e.g., allocframe) attempts to allocate a stack frame on a stack associated with the task 402, as described herein. For example, the stack manager 112 performs the allocation request by storing (e.g., pushing) a LR value of the LR register 290 of FIG. 2, a FP value of the FP register 234 of FIG. 2, or both, on the stack. The stack manager 112 updates the FP register 234 to indicate a SP value of the SP register 236. The stack manager 112 determines a local data size to be allocated to store one or more local values, one or more arguments, or a combination thereof, of the function call. The stack manager 112 determines a first value based on the SP value of the SP register 236 and the local data size (e.g., first value=the SP value–the local data size). The stack manager 112 attempts to update the SP register 236 to indicate the first value. If the first value is beyond (e.g., is less than) a frame limit indicated by the frame limit register 292, the exception 282 of FIG. 2 is generated.

A deallocation request (e.g., deallocframe) deallocates a stack frame on a stack associated with the task 402, as described herein. For example, the stack manager 112 performs the deallocation request by restoring the values of the SP register 236, the FP register 234, the LR register 290, or a combination thereof. To illustrate, the stack manager 112 updates the SP register 236 to indicate a memory location at the end of a previous stack (e.g., a value indicated by the FP register 234). The stack manager 112 updates the FP register 234 to indicate the FP value retrieved from the stack. The stack manager 112 updates the LR register 290 to indicate the LR value retrieved from the stack.

The first function call 404 includes an allocation request (e.g., at address 0x300) for a stack frame having a first size (e.g., 2 bytes). In a particular aspect, the stack manager 112, in response to determining that the first stack 252 has an available stack space (e.g., 8 bytes) that is greater than or equal to the first size, allocates a first stack frame (e.g., stack frame 256) of the first stack 252 to the task 402. In a particular aspect, the stack manager 112 performs the allocation request by storing (e.g., pushing) the LR value 264 of FIG. 2 (e.g., 0x30, a return address of the first function call 404), the FP value 266 of FIG. 2, or both, to the first stack 252. The stack manager 112 updates the FP register 234 to indicate a SP value of the SP register 236. The stack manager 112 determines a local data size to be allocated to store one or more local values, one or more arguments, or a combination thereof, of the first function call 404. The stack manager 112 determines a first value based on the SP value of the SP register 236 and the local data size (e.g., first value=the SP value–the local data size). The stack manager 112 updates the SP register 236 to indicate the first value. Because the first value is within (e.g., is greater than or equal to) the frame limit 278 indicated by the frame limit register 292, the exception 408 is not generated. The first stack frame (e.g., stack frame 256) is associated with the first function call 404.

The stack manager 112, in response to detecting a deallocation request (e.g., at address 0x320), detects that the task 402 is returning from the first function call 404, and removes the first stack frame (e.g., stack frame 256) from the first stack 252. To illustrate, the stack manager 112 performs the deallocation request by restoring the values of the SP register 236, the FP register 234, the LR register 290, or a combination thereof. The stack manager 112 updates the SP register 236 to indicate a value of the FP register 234. The stack manager 112 updates the FP register 234 to indicate the FP value 266 retrieved from the first stack 252. The stack manager 112 updates the LR register 290 to indicate the LR value 264 retrieved from the first stack 252. For example, the LR value 264 of FIG. 2 indicates a return address (e.g., 0x30) of the first function call 404 and execution of the task 402 continues at the return address indicated by the LR value 264.

The second function call 406 includes an allocation request (e.g., at address 0x400) for a stack frame having a second size (e.g., 20 bytes). An exception 408 is generated (e.g., by the stack manager 112) in response to the allocation request. In a particular aspect, the stack manager 112 (or a memory handler) generates the exception 408 in response to determining that the second size (e.g., 20 bytes) exceeds an available stack space (e.g., 8 bytes) of the first stack 252. In a particular aspect, the stack manager 112 performs the allocation request by storing (e.g., pushing) the LR value 268 of FIG. 2 (e.g., 0x50, a return address of the second function call 406), the FP value 270 of the FP register 234, or both, to the first stack 252. The stack manager 112 updates the FP register 234 to indicate the SP value 272 of the SP register 236. The stack manager 112 determines a local data size to be allocated to store the local values 202, the arguments 204 of FIG. 2, or a combination thereof, of the second function call 406. The stack manager 112 determines a first value based on the SP value of the SP register 236 and the local data size (e.g., first value=the SP value−the local data size). The stack manager 112 updates the SP register 236 to indicate the first value. Because the first value is beyond (e.g., is less than) the frame limit 278 indicated by the frame limit register 292, the exception 408 is generated. In a particular aspect, the updates to the first stack 252, the FP register 234, or a combination thereof, are reverted in response to the exception 408. For example, the stack manager 112 updates the FP register 234 to indicate the FP value 270. As another example, the stack manager 112 removes the LR value 268, the FP value 270, or both, from the first stack 252. In a particular aspect, the exception handler 142, in response to the exception 408, allocates the stack frame 260 on the second stack 254 to the task 402.

The exception handler 142 adds the frame limit 278 to (e.g., a top of) the second stack 254. The exception handler 142 updates the frame limit register 292 to indicate the frame limit 280 of the second stack 254. The exception handler 142 adds the SP value 272 of the SP register 236 to the second stack 254. The exception handler 142 adds the LR value 268 to the second stack 254. The LR value 268 indicates a return address of the second function call 406 (e.g., 0x50). The exception handler 142 adds the FP value 270 of the FP register 234 to the second stack 254. The exception handler 142 updates the FP register 234 to indicate a memory location of the second stack 254 at which the LR value 268 is stored. The exception handler 142 adds the local values 202, the arguments 204, or a combination thereof, to the second stack 254. The exception handler 142 updates the SP register 236 to indicate a memory location of the second stack 254 that is next to the memory allocated to the stack frame 260 in the second stack 254. For example, a value of the SP register 236 indicates a memory location of the second stack 254 that is next available to be allocated or that is at the end of the second stack 254 (e.g., if the second stack 254 is full). In a particular implementation, the second stack 254 grows from a higher memory address to a lower memory address. In this implementation, the exception handler 142 determines a first value based on a first address indicating a beginning (e.g., top) of the stack frame 260 and a particular size of the stack frame 260 (e.g., first value=first address−size of 1 stack frame) and updates the SP register 236 to indicate the first value. The exception handler 142 updates the LR register 290 to indicate the return handler address 274, as described with reference to FIG. 2.

The stack manager 112, in response to detecting a deallocation request (e.g., at address 0x420), detects that the task 402 is returning from the second function call 406. The stack manager 112 removes the second stack frame (e.g., stack frame 260) from the second stack 254. To illustrate, the stack manager 112 performs the deallocation request by restoring the values of the SP register 236, the FP register 234, the LR register 290, or a combination thereof. The stack manager 112 updates the SP register 236 to indicate a value (e.g., a memory location of the second stack 254 at which the LR value 268) of the FP register 234. The stack manager 112 updates the FP register 234 to indicate the FP value 270 retrieved from the second stack 254. The stack manager 112 determines that an instruction (e.g., of the return handler 144) stored at the return handler address 274 indicated the LR register 290 is to be executed and updates the LR register 290 to indicate the LR value 268 retrieved from the second stack 254. The return handler 144 performs a return operation 410 that enables transition of the stack manager 112 from the second stack 254 to the first stack 252. For example, the return handler 144 updates the SP register 236 to indicate the SP value 272 retrieved from the second stack 254, the frame limit register 292 to indicate the frame limit 278 retrieved from the second stack 254, or both. The return handler 144 continues execution of the task 402 at the address (e.g., the return address of the second function call 406) indicated by the LR register 290.

The example 400 thus illustrates dynamic allocation of the second stack 254 for the task 402 when a frame size requested by the task 402 exceeded an available space of the first stack 252. The example 400 also illustrates transitioning from the second stack 254 to the first stack 252 when the second stack 254 is no longer in use by the task 402.

Figure 5:
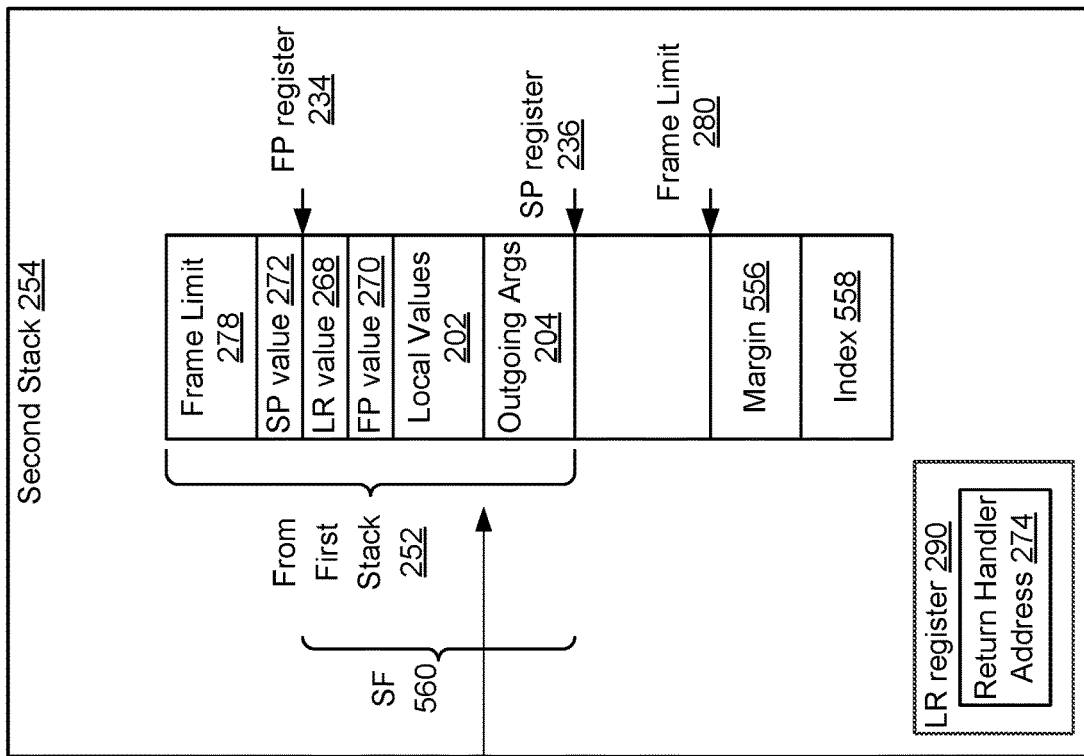
FIG. 5 is a diagram of a particular illustrative example of stack management.
Figure 5:
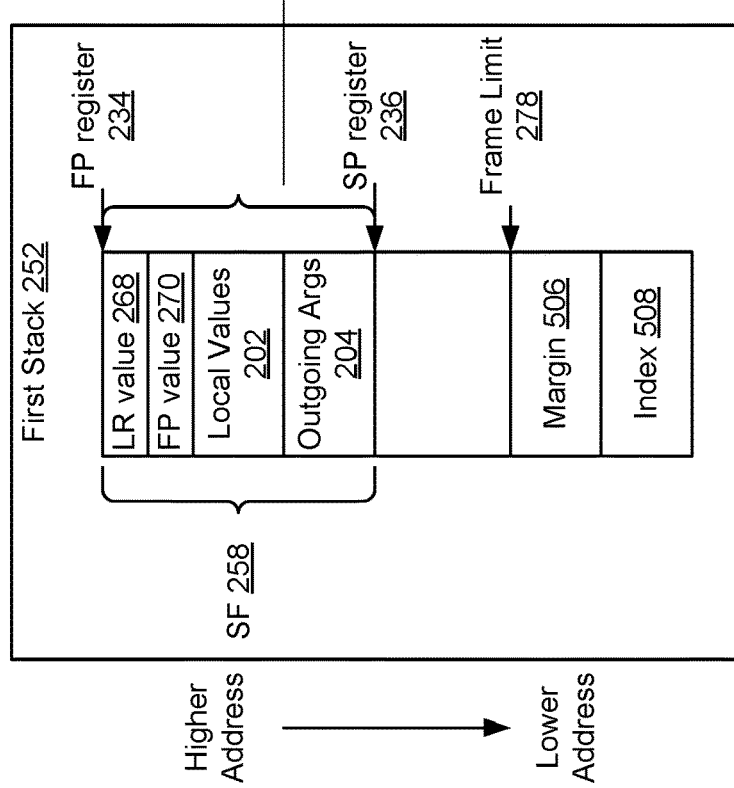

Referring to FIG. 5, an example of stack management is shown and generally designated 500. In a particular aspect, the stack management is performed by the stack manager 112, the exception handler 142, the return handler 144 of FIG. 1, or a combination thereof.

In the example 200 of FIG. 2, the stack manager 112 (e.g., the exception handler 142), in response to a determination that a size of a stack frame for a function call exceeds the available space in the first stack 252, allocates a stack frame for the function call in the second stack 254. In the example 500, the exception handler 142, in response to a determination that a size of a requested stack frame for a second function call exceeds the available space in the first stack 252, allocates a stack frame corresponding to the previous function call (e.g., the first function call) to the second stack 254 in addition to allocating a stack frame for the second function call to the second stack 254 so that arguments of the first function call are easily accessible by the second function call.

The first stack 252 includes an index 508. In a particular aspect, a value of the index 508 indicates a first stack tier (e.g., the first stacks 310, the second shared stacks 320, the third shared stacks 330, the fourth shared stacks 340, or the fifth shared stacks 350 of FIG. 3) that includes the first stack 252. The first stack 252 includes a margin 506 (e.g., a reserved space).

The second stack 254 includes an index 558. In a particular aspect, a value of the index 558 indicates a second stack tier (e.g., the first stacks 310, the second shared stacks 320, the third shared stacks 330, the fourth shared stacks 340, or the fifth shared stacks 350 of FIG. 3) that includes the second stack 254. The second stack 254 includes a margin 556 (e.g., a reserved space).

The stack frame 258 includes the LR value 268, the FP value 270, the local values 202, the arguments 204, or a combination thereof, as described with reference to FIG. 2. In a particular aspect, the stack manager 112 adds the stack frame 258 to the first stack 252 as part of execution of a first function call. The FP register 234 indicates an address of a memory location of the first stack 252 at which the LR value 268 is stored. The SP register 236 indicates the SP value 272, e.g., an address of a memory location of the first stack 252 that is next (e.g., next available to be allocated) to the memory allocated to the stack frame 258.

The exception handler 142 selects the second stack 254 in response to an exception indicating that a requested stack frame size for a second function call has exceeded the first stack 252, that the index 508 of the first stack 252 indicates the first tier, that the index 558 of the second stack 254 indicates the second tier, and that the second tier is next above the first tier. The exception handler 142 copies a value (e.g., the frame limit 278) indicated by the frame limit register 292 to the second stack 254. The exception handler 142 copies the SP value 272 of the SP register 236 to the second stack 254. The exception handler 142 allocates a stack frame 560 of the second stack 254 to the first function call. The exception handler 142 copies values (including copying the LR value 268, copying the FP value 270, copying the local values 202, copying arguments 204, or a combination thereof) from the stack frame 258 of the first stack 252 to the stack frame 560 of the second stack 254.

The exception handler 142 updates the FP register 234 to indicate the FP value 288, e.g., a memory address of the second stack 254 at which the stack frame 560 (e.g., the LR value 268) is stored. The exception handler 142 updates the SP register 236 to indicate a memory address of the second stack 254 that is next to the stack frame 560. The exception handler 142 updates the frame limit register 292 to indicate the frame limit 280 of the second stack 254. The exception handler 142 updates the LR register 290 to indicate the return handler address 274.

In a particular aspect, the exception handler 142 adds the stack frame 284 of FIG. 2 to the second stack 254. For example, the exception handler 142 copies the return handler address 274 indicated by the LR register 290 to the second stack 254. The exception handler 142 copies the FP value 288 indicated by the FP register 234 to the second stack 254. The exception handler 142 updates the LR register 290 to indicate a return address of the second function call. The exception handler 142 updates the FP register 234 to indicate a value (e.g., a memory location of the second stack 254 at which the return handler address 274 is stored) indicated by the SP register 236. The exception handler 142 updates the FP register 234 to indicate a memory location of the second stack 254 next to the memory allocated to the stack frame 284. The stack frame 284 is associated with the second function call.

By copying the stack frame 258 (e.g., in portions of the stack frame 560) to the second stack 254, the arguments 204 are easily accessible by a subsequent function (e.g., the second function call) added to the second stack 254 via a stack pointer position in the second stack 254 (e.g., by counting back from the SP register 236) to provide simplified argument passing in some implementations.

The stack manager 112, in response to determining that the first task is returning from the second function call, removes the stack frame 284 from the second stack 254, determines that execution of the first task is to continue from an instruction at an address indicated by the LR register 290, and updates the LR register 290 to indicate the return handler address 274 retrieved from the second stack 254. The stack manager 112 updates the SP register 236 to indicate a value (e.g., a memory location of the second stack 254 at which the return handler address 274 was stored) indicated by the FP register 234. The stack manager 112 updates the FP register 234 to indicate the FP value 288 retrieved from the second stack 254.

The stack manager 112, in response to determining that the first task is returning from the first function call, initiates execution of the return handler 144 at the return handler address 274 indicated by the LR register 290. For example, the return handler 144 removes the stack frame 560 from the second stack 254, removes the stack frame 258 from the first stack 252, or both. To illustrate, the return handler 144 updates the SP register 236 to indicate the SP value 272, the FP register 234 to indicate the FP value 270, the LR register 290 to indicate the LR value 264, the frame limit register 292 to indicate the frame limit 278, or a combination thereof. The return handler 144 continues execution of the first task at the return address of the first function call indicated by the LR value 264 of the LR register 290.

The examples 200 and 500 thus illustrate that various metadata can be stored on the second stack 254 to configure the stack manager 112 (e.g., the return handler 144) to transition from the second stack 254 to the first stack 252 upon detecting that the second stack 254 is no longer in use by the first task.

Figure 6:
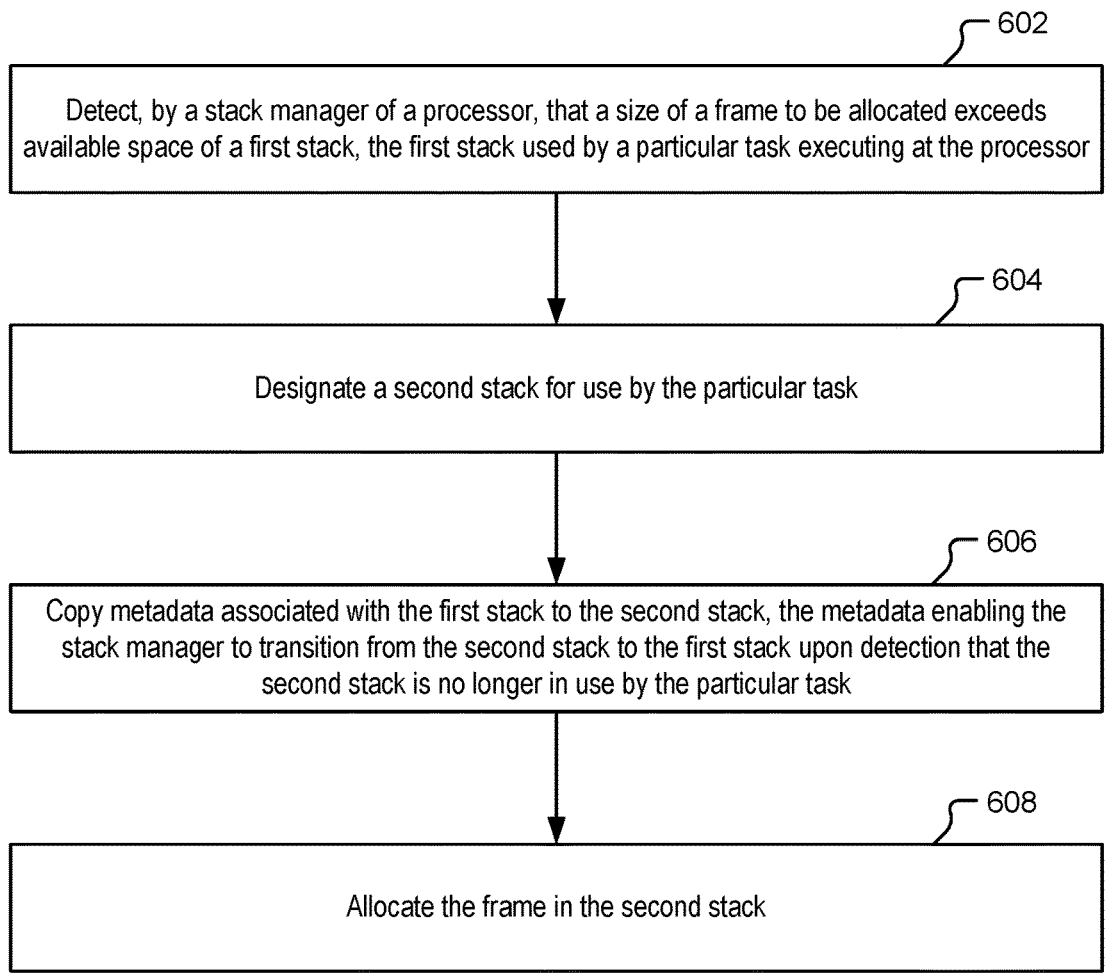
FIG. 6 is a diagram of a particular illustrative example of a method of stack management.

FIG. 6 illustrates a method 600 of stack management. In a particular aspect, one or more operations of the method 600 are performed by the exception handler 142, the return handler 144, the stack manager 112 of FIG. 1, or a combination thereof.

The method 600 includes detecting, by a stack manager of a processor, that a size of a frame to be allocated exceeds available space of a first stack, at 602. For example, the exception handler 142 of FIG. 1 detects that a size of a frame to be allocated exceeds available space of the first stack 252, as described with reference to FIG. 2. For example, the exception handler 142, in response to the exception 282 of FIG. 2, detects that the size of the frame exceeds the available space. The first stack 252 is used by a first task (e.g., the task 402 of FIG. 4) executing at the processor 102 (e.g., the core 106).

The method 600 also includes designating a second stack for use by the particular task, at 604. For example, the exception handler 142 of FIG. 1 designates the second stack 254 for use by the first task (e.g., the task 402 of FIG. 4), as described with reference to FIGS. 2-5.

The method 600 further includes copying metadata associated with the first stack to the second stack, at 606. For example, the exception handler 142 of FIG. 1 copies the metadata 262 associated with the first stack 252 to the second stack 254, as described with reference to FIGS. 2 and 4-5. The metadata 262 enables the stack manager 112 to transition from the second stack 254 to the first stack 252 upon detection that the second stack 254 is no longer in use by the first task (e.g., the task 402 of FIG. 4).

The method 600 also includes allocating the frame in the second stack, at 608. For example, the exception handler 142 of FIG. 1 allocates the stack frame 284 in the second stack 254, as described with reference to FIG. 2.

The method 600 thus enables transitioning from the first stack 252 to the second stack 254 independently of the MMU 110. The method 600 enables additional stack space to be dynamically allocated to tasks that exceed a corresponding allocation in a first stack.

Figure 7:
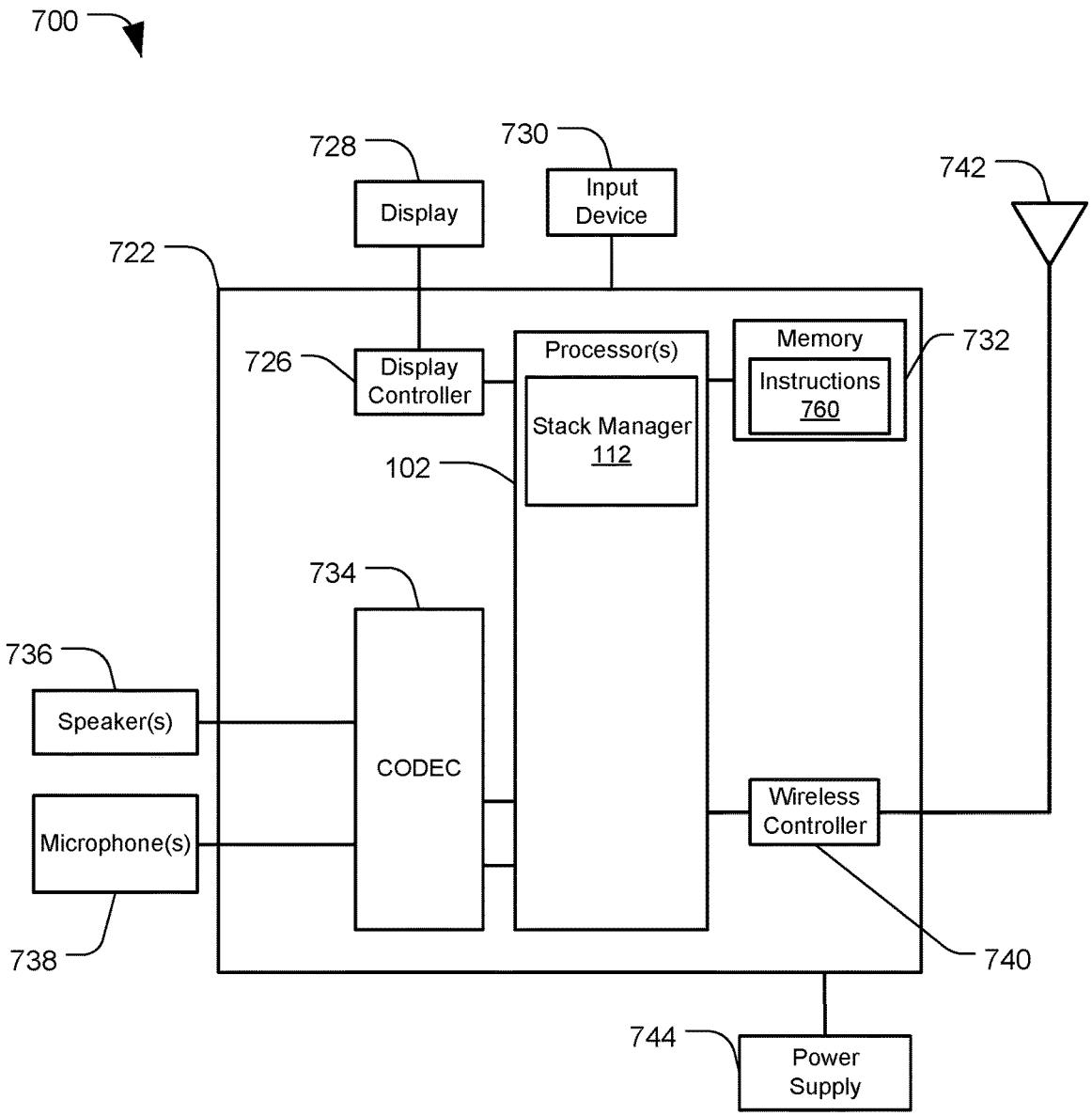
FIG. 7 is a block diagram of a particular illustrative example of a device that is operable to perform stack management.

Referring to FIG. 7, a block diagram of a particular illustrative example of a device (e.g., a wireless communication device) is depicted and generally designated 700. In various examples, the device 700 includes fewer or more components than illustrated in FIG. 7. In an illustrative example, the device 700 corresponds to the system 100 of FIG. 1. In an illustrative example, the device 700 performs one or more operations described with reference to FIGS. 1-6.

In a particular aspect, the device 700 includes the processor 102. The processor 102 includes the stack manager 112. The processor 102 is coupled via a wireless controller 740 to an antenna 742. The device 700 also includes a memory 732. In a particular implementation, the memory 732 includes the memory 114 of FIG. 1. The device 700 includes a display 728 coupled to a display controller 726. One or more speakers 736, one or more microphones 738, or a combination thereof may be coupled to a coder/decoder (CODEC) 734.

The memory 732 may include instructions 760 executable by the processor 102, the CODEC 734, the stack manager 112, another processing unit of the device 700, or a combination thereof, to perform methods and processes disclosed herein, such as one or more operations described with reference to FIGS. 1-6. One or more components of the systems and devices described with reference to FIGS. 1-7 may be implemented via dedicated hardware (e.g., circuitry), by a processor executing instructions (e.g., the instructions 760) to perform one or more tasks, or a combination thereof. As an example, the memory 732 or one or more components of the processor 102, the stack manager 112, and/or the CODEC 734 includes a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). The memory device includes instructions (e.g., the instructions 760) that, when executed by a computer (e.g., a processor in the CODEC 734, the stack manager 112, and/or the processor 102), causes the computer to perform one or more operations described with reference to FIGS. 1-6. As an example, the memory 732 or the one or more components of the processor 102, the stack manager 112, the CODEC 734 is a computer-readable storage device that stores instructions (e.g., the instructions 760) that, when executed by a computer (e.g., a processor in the CODEC 734, the stack manager 112, and/or the processor 102), cause the computer perform one or more operations described with reference to FIGS. 1-6.

In a particular aspect, the device 700 is included in a system-in-package or system-on-chip device 722, such as a mobile station modem (MSM). In a particular aspect, the processor 102, the display controller 726, the memory 732, the CODEC 734, the stack manager 112, and the wireless controller 740 are included in a system-in-package or the system-on-chip device 722. In a particular aspect, an input device 730, such as a touchscreen and/or keypad, and a power supply 744 are coupled to the system-on-chip device 722. Moreover, in a particular aspect, as illustrated in FIG. 7, the display 728, the input device 730, the speakers 736, the microphones 738, the antenna 742, and the power supply 744 are external to the system-on-chip device 722. However, each of the display 728, the input device 730, the speakers 736, the microphones 738, the antenna 742, and the power supply 744 can be coupled to a component of the system-on-chip device 722, such as an interface or a controller. In an illustrative example, the device 700 corresponds to a communication device, a computer, a display device, a television, a gaming console, a music player, a radio, a video player, an entertainment unit, a personal media player, a digital video player, a camera, a navigation device, a mobile communication device, a smartphone, a cellular phone, a laptop computer, a tablet computer, a personal digital assistant, a display device, an optical disc player, a tuner, a decoder system, an encoder system, or any combination thereof.

In an illustrative aspect, the stack manager 112 is operable to perform stack management in accordance with the described techniques. For example, the stack manager 112 detects that a size of a frame to be allocated exceeds available space of a first stack 252 of FIG. 2. The first stack 252 used by a first task executing at the processor 102. The stack manager 112 designates the second stack 254 of FIG. 2 for use by the first task. The stack manager 112 copies metadata associated with the first stack 252 to the second stack 254. The metadata enables the stack manager 112 to transition from the second stack 254 to the first stack 252 upon detection that the second stack 254 is no longer in use by the first task. The stack manager 112 allocates the frame in the second stack 254.

In conjunction with the described aspects, an apparatus is disclosed that includes means for detecting that a size of a frame to be allocated exceeds available space of a first stack. For example, the means for detecting include the exception handler 142, the stack manager 112 of FIG. 1, one or more devices configured to detect that a size of a frame to be allocated exceeds available space of a first stack receive a first audio input (e.g., a processor executing instructions stored at a computer-readable storage device), or any combination thereof. The first stack 252 is used by a particular task executing at the processor 102 (e.g., the core 106).

The apparatus also includes means for designating a second stack for use by the particular task. For example, the means for designating include the exception handler 142, the stack manager 112 of FIG. 1, one or more devices configured to designate a second stack for use by the particular task (e.g., a processor executing instructions stored at a computer-readable storage device), or any combination thereof.

The apparatus further includes means for copying metadata associated with the first stack to the second stack. For example, the means for copying include the exception handler 142, the stack manager 112 of FIG. 1, one or more devices configured to copy metadata associated with the first stack to the second stack (e.g., a processor executing instructions stored at a computer-readable storage device), or any combination thereof. The metadata 262 enables the stack manager 112 of the processor 102 to transition from the second stack 254 to the first stack 252 upon detection that the second stack 254 is no longer in use by the particular task.

The apparatus also includes means for allocating the frame in the second stack. For example, the means for allocating include the exception handler 142, the stack manager 112 of FIG. 1, one or more devices configured to allocate the frame in the second stack (e.g., a processor executing instructions stored at a computer-readable storage device), or any combination thereof.

In a particular aspect, the apparatus further includes means for transitioning from the second stack to the first stack in response to detecting that the particular task is returning from a function associated with the frame. For example, the means for transitioning include the return handler 144, the stack manager 112 of FIG. 1, one or more devices configured to transition from the second stack to the first stack (e.g., a processor executing instructions stored at a computer-readable storage device), or any combination thereof.

As used herein, "coupled" may include communicatively coupled, electrically coupled, magnetically coupled, physically coupled, optically coupled, and combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc.

As used herein, "generating," "calculating," "using," "selecting," "accessing," and "determining" may be used interchangeably. For example, "generating," "calculating," or "determining" a value, a characteristic, a parameter, or a signal may refer to actively generating, calculating, or determining a value, a characteristic, a parameter, or a signal or may refer to using, selecting, or accessing a value, a characteristic, a parameter, or a signal that is already generated, such as by a component or a device.

Those of skill would further appreciate that the various illustrative logical blocks, configurations, modules, circuits, and algorithm steps described in connection with the aspects disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device for stack management comprising:
   multiple tiers of stacks, each tier of stacks comprising shared stacks, wherein each tier of stacks of the multiple tiers of stacks includes fewer and larger stacks as compared to a previous tier of stacks of the multiple tiers of stacks;
   a first memory configured to include a first count of first stacks that are included in a first stack tier of the multiple tiers of stacks, wherein each of the first stacks is of a first stack size;
   a second memory configured to include a second count of second stacks that are included in a second stack tier of the multiple tiers of stacks, wherein each of the second stacks is of a second stack size, wherein the second count is less than the first count, and wherein the second stack size is greater than the first stack size; and
   a stack manager of a processor, the stack manager configured to:
      detect that a size of a frame to be allocated exceeds available space of a first stack of the first stacks, the first stack used by a particular task executing at the processor;
      responsive to determining that the size of the frame to be allocated exceeds the available space of the first stack, select a second stack from one or more unallocated stacks of the second stack tier and designate the second stack for use by the particular task;
      copy metadata associated with the first stack to the second stack, the metadata enabling the stack manager to transition from the second stack to the first stack upon detection that the second stack is no longer in use by the particular task; and
      allocate the frame in the second stack.

2. The device of claim 1, wherein the processor includes the first memory, and wherein the second memory is external to the processor.

3. The device of claim 1, wherein the stack manager is further configured to:
   based at least in part on determining that the size of the frame to be allocated exceeds the available space of the first stack, store an address of a return handler in a link return register, wherein the frame allocated in the second stack is associated with a function call; and
   in response to the particular task returning from the function call, execute the return handler corresponding to the address stored in the link return register.

4. The device of claim 1, wherein the stack manager is further configured to:
   maintain allocation bit masks corresponding to the shared stacks of the multiple tiers, wherein each bit of a bit mask is associated with a respective one of the shared stacks; and
   in response to detecting that the size of the frame to be allocated exceeds the available space of the first stack, determine, based on the allocation bit masks, whether any shared stacks of the second stack tier are available for allocation.

5. The device of claim 1, wherein the stack manager is further configured to, in response to the particular task returning from a function associated with the frame, execute a return handler that reconfigures the stack manager to transition to the first stack based on the metadata.

6. The device of claim 1, wherein the stack manager is further configured to, in response to the particular task returning from a function associated with the frame, deallocate the second stack from the particular task.

7. The device of claim 6, wherein the stack manager is further configured to, subsequent to deallocating the second stack from the particular task, designate the second stack as available for a next allocation while the second stack is stored in a cache memory.

8. The device of claim 1, wherein each particular tier of stacks includes a pre-determined count of stacks of a pre-determined size, and wherein the pre-determined count and the pre-determined size are associated with a level of the particular tier in the multiple tiers.

9. A method of managing a stack, the method comprising:
detecting, by a stack manager of a processor, that a size of a frame to be allocated exceeds available space of a first stack, the first stack used by a particular task executing at the processor, wherein a first stack tier of multiple tiers of stacks includes a first count of first stacks, wherein each of the first stacks is of a first stack size, wherein the first stack is included in the first stacks a particular stack tier of multiple tiers of stacks, wherein each tier of stacks comprises shared stacks, and wherein each tier of stacks of the multiple tiers of stacks includes fewer and larger stacks as compared to a previous tier of stacks of the multiple tiers of stacks;
responsive to determining that the size of the frame to be allocated exceeds the available space of the first stack, selecting a second stack from one or more unallocated stacks of a second stack tier of the multiple tiers of stacks and designating the second stack for use by the particular task, wherein the second stack tier includes a second count of second stacks, wherein each of the second stacks is of a second stack size, wherein the second stack is included in the second stacks, wherein the second count is less than the first count, and wherein the second stack size is greater than the first stack size;
copying metadata associated with the first stack to the second stack, the metadata enabling the stack manager to transition from the second stack to the first stack upon detection that the second stack is no longer in use by the particular task; and
allocating the frame in the second stack.

10. The method of claim 9, wherein detecting that the size of the frame to be allocated exceeds the available space of the first stack includes detecting an exception caused by a stack limit.

11. The method of claim 10, wherein the selecting, the designating, the copying, and the allocating are performed by an exception handler in the processor in response to the exception.

12. The method of claim 9, further comprising, based at least in part on determining that the size of the frame to be allocated exceeds the available space of the first stack, storing an address of a return handler in a link return register, wherein the frame allocated in the second stack is associated with a function call.

13. The method of claim 12, further comprising, in response to the particular task returning from the function call, executing the return handler corresponding to the address stored in the link return register.

14. The method of claim 9, further comprising, in response to the particular task returning from a function associated with the frame, executing a return handler that reconfigures the stack manager to transition to the first stack based on the metadata.

15. The method of claim 9, further comprising, in response to the particular task returning from a function associated with the frame, deallocating the second stack from the particular task.

16. The method of claim 15, further comprising, subsequent to deallocating the second stack from the particular task, designating the second stack as available for a next allocation while the second stack is stored in a cache memory.

17. The method of claim 14, wherein reconfiguring the stack manager includes copying one or more register values indicated by the metadata to one or more registers to restore a register state.

18. The method of claim 9, further comprising:
detecting, by the stack manager, that a second size of a second frame to be allocated exceeds available space of the second stack; and
designating a third stack to be used by the particular task.

19. The method of claim 9, wherein the designating of the second stack and the transitioning from the second stack to the first stack are performed independently of a memory management unit.

20. The method of claim 9, wherein the first stack is included in a first memory that has a reduced latency time as compared to a second memory that includes the second stack.

21. The method of claim 20, wherein the first memory includes a tightly coupled memory (TCM).

22. The method of claim 20, further comprising:
allocating, for each new task initiated at the processor, a corresponding initial stack in the first memory; and
dynamically allocating, for each task that exceeds its initial stack, a corresponding secondary stack in the second memory.

23. The method of claim 9, further comprising copying arguments of a function from the first stack to the second stack to be accessible via a stack pointer position in the second stack.

24. A non-transitory computer-readable medium storing instructions that, when executed by a processor, cause the processor to:
detect that a size of a frame to be allocated exceeds available space of a first stack, the first stack used by a particular task executing at the processor, wherein a first stack tier of multiple tiers of stacks includes a first count of first stacks, wherein each of the first stacks is of a first stack size, wherein the first stack is included in the first stacks, wherein each tier of stacks comprises shared stacks, and wherein each tier of stacks of the multiple tiers of stacks includes fewer and larger stacks as compared to a previous tier of stacks of the multiple tiers of stacks;
responsive to determining that the size of the frame to be allocated exceeds the available space of the first stack, select a second stack from one or more unallocated stacks of a second stack tier of the multiple tiers of stacks and designate the second stack for use by the particular task, wherein the second stack tier includes a second count of second stacks, wherein each of the second stacks is of a second stack size, wherein the second stack is included in the second stacks, wherein the second count is less than the first count, and wherein the second stack size is greater than the first stack size;

copy metadata associated with the first stack to the second stack, the metadata enabling a stack manager to transition from the second stack to the first stack upon detection that the second stack is no longer in use by the particular task; and allocate the frame in the second stack.

25. The non-transitory computer-readable medium of claim 24, wherein the instructions, when executed by the processor, cause the processor to, in response to the particular task returning from a function associated with the frame, execute a return handler that reconfigures the stack manager to transition to the first stack based on the metadata.

26. The non-transitory computer-readable medium of claim 24, wherein the instructions, when executed by the processor, cause the processor to, in response to the particular task returning from a function associated with the frame, deallocate the second stack from the particular task.

27. The non-transitory computer-readable medium of claim 26, wherein the instructions, when executed by the processor, cause the processor to, subsequent to deallocating the second stack from the particular task, designate the second stack as available for a next allocation while the second stack is stored in a cache memory.

28. The non-transitory computer-readable medium of claim 24, wherein each particular tier of stacks includes a pre-determined count of stacks of a pre-determined size, and wherein the pre-determined count and the pre-determined size are associated with a level of the particular tier in the multiple tiers.

29. An apparatus comprising:

means for detecting, at a processor, that a size of a frame to be allocated exceeds available space of a first stack, the first stack used by a particular task executing at the processor, wherein a first stack tier of multiple tiers of stacks includes a first count of first stacks, wherein each of the first stacks is of a first stack size, wherein the first stack is included in the first stacks, wherein each tier of stacks comprises shared stacks, and wherein each tier of stacks of the multiple tiers of stacks includes fewer and larger stacks as compared to a previous tier of stacks of the multiple tiers of stacks;

means for selecting, at the processor, a second stack from one or more unallocated stacks of a second stack tier of the multiple tiers of stacks, wherein the second stack tier includes a second count of second stacks, wherein each of the second stacks is of a second stack size, wherein the second stack is included in the second stacks, wherein the second count is less than the first count, and wherein the second stack size is greater than the first stack size;

means for designating, at the processor, the second stack for use by the particular task;

means for copying, at the processor, metadata associated with the first stack to the second stack, the metadata enabling a stack manager of the processor to transition from the second stack to the first stack upon detection that the second stack is no longer in use by the particular task; and means for allocating, at the processor, the frame in the second stack.

30. The apparatus of claim 29, further comprising means for transitioning, at the processor, from the second stack to the first stack in response to detecting that the particular task is returning from a function associated with the frame.

* * * * *